Sept. 16, 1952 P. F. SMITH 2,610,815
PARACHUTE DEPLOYING MEANS
Filed Aug. 25, 1947 2 SHEETS—SHEET 2
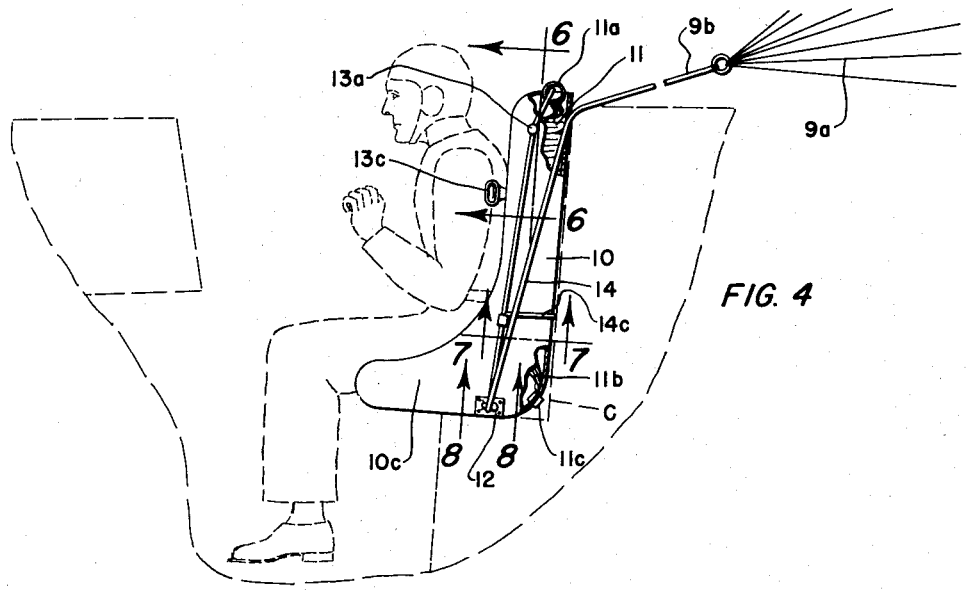
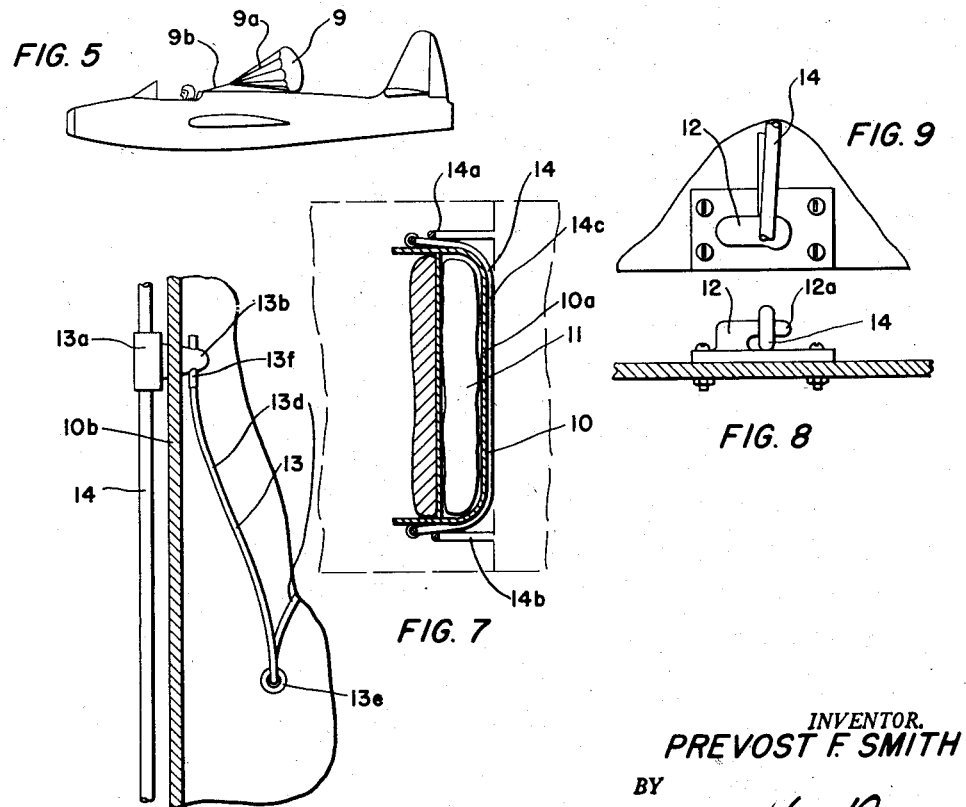
INVENTOR.
PREVOST F. SMITH
BY
Wm. H. Dean
AGENT Patented Sept. 16, 1952

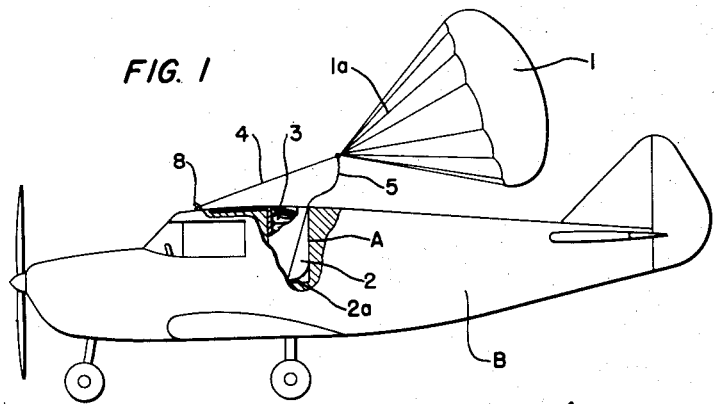
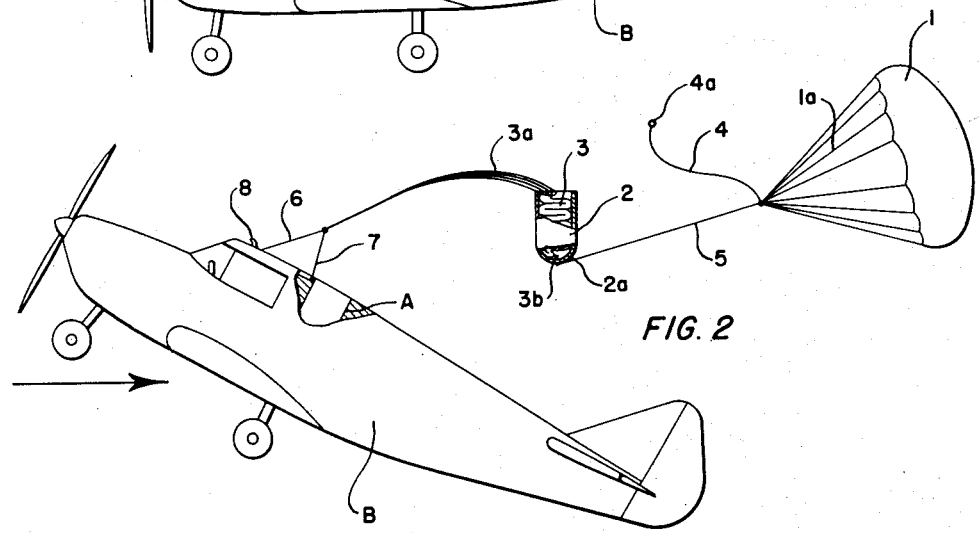
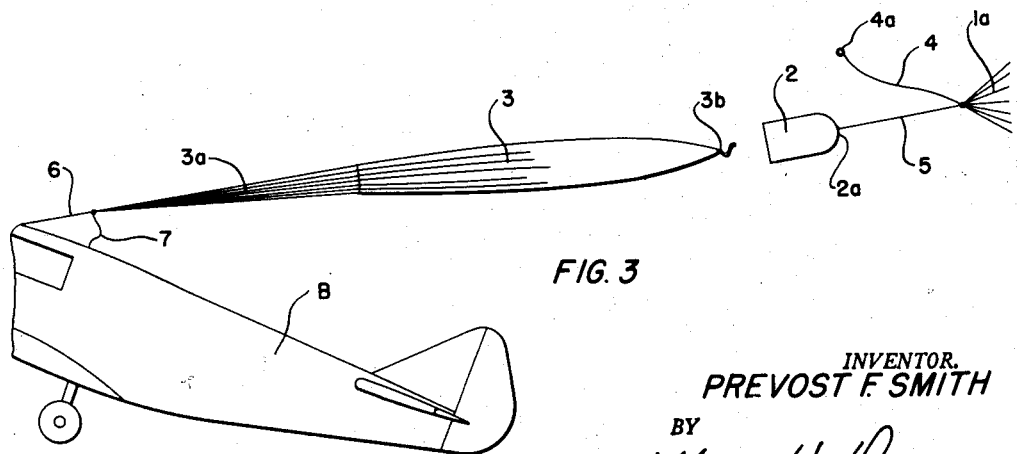

2,610,815

UNITED STATES PATENT OFFICE 2,610,815

PARACHUTE DEPLOYING MEANS

Prevost F. Smith, San Diego, Calif.

Application August 25, 1947, Serial No. 770,508

10 Claims. (Cl. 244—139)

My invention relates to parachute deploying means more particularly for use in positively clearing the main parachute designed to suspend and lower an aircraft from the tail group thereof, and the objects of my invention are:

First, to provide a parachute deploying means of this class in which an ejection cable connected to a pilot parachute is secured to the bottom of a container, positioned within the upper portion of an upper airplane fuselage, and containing the main parachute, whereby, substantial catapulted ejection of the main parachute is accomplished at right angles to the axis of the aircraft for efficiently clearing the main parachute from the tail group of the airplane during opening of the main parachute.

Second, to provide a parachute deploying means of this class which may be very effectively used in efficiently clearing a pilot from the tail group of an airplane traveling at high speed.

Third, to provide a parachute deploying means of this class in which the middle portion of a main parachute stored in the upper portion of an aircraft is connected to the bottom of a container in which said main parachute is stowed so that the main parachute is effectively opened by a pilot parachute cable which is secured to said container at its bottom portion preliminary to the ejection of said main parachute.

Fourth, to provide a parachute deploying means of this class by which the pilot or other cargo may be effectively ejected from a disabled airplane and decelerated to a safe speed before the main parachute designed to suspend and lower said pilot and cargo is opened.

Fifth, to provide a parachute deploying means of this class in which the person's chair may be slidably mounted in an aircraft at right angles to the axis of the fuselage thereof, whereby a pilot parachute ejects said chair from the aircraft and slows the same to certain speed whereupon the main parachute may be released for safely lowering the person in the chair to the ground.

Sixth, to provide a parachute deploying means of this class which is very simple and economical of construction, efficient in operation, and which will not readily deteriorate or get out of order.

Seventh, to provide a parachute deploying means of this class which will eject a pilot clear of a high speed airplane in a controlled position thereby preventing tumbling and subsequent danger to the pilot by becoming entangled in his main parachute when it is deployed.

Eighth, to provide a parachute deploying means of this class which will effectively cooperate with other methods of ejecting a pilot from a high speed airplane so as to control the position and prevent tumbling and subsequent danger to the pilot by becoming entangled in his main parachute when it is deployed.

With these and other objects in view as will appear hereinafter, my invention consists of certain novel features of constructions, combination and arrangement of parts and portions, as will be hereinafter described in detail and particularly set forth in the appended claims, reference being had to the accompanying drawings and to the characters of reference thereon forming a part of this application in which:

Figure 1 is a side elevational view of an aircraft showing my parachute deploying means in connection therewith illustrating portions of the aircraft and said parachute deploying means broken away and in section to amplify the illustration.

Figure 2 is a side elevational view of an aircraft showing my parachute deploying means in connection therewith, illustrated in an advanced operational position relatively to that shown in Fig. 1 of the drawings and illustrating portions broken away and in section to amplify the illustration;

Fig. 3 is a fragmentary side elevational view of an aircraft showing fragmentarily my parachute deploying means in connection therewith in an advanced operational disposition relatively to that as shown in Fig. 2 of the drawings wherein the main parachute is fully deployed for suspending and lowering the aircraft to the ground;

Fig. 4 is a side elevational view of a modified form of my parachute deploying means showing by dash lines the relative position of portions of an aircraft and pilot therein, and illustrating the pilot parachute in open position; Fig. 5 is a side elevational view of the aircraft shown on reduced scale from that as shown in Fig. 4 of the drawings illustrating the same conditions of operation as disclosed in Fig. 4 of the drawings wherein the pilot parachute is deployed. Fig. 6 is an enlarged fragmentary sectional view taken from the line 6—6 of Fig. 4; Fig. 7 is an enlarged sectional view taken from the line 7—7 of Fig. 4; Fig. 8 is an enlarged fragmentary sectional view taken from the line 8—8 of Fig. 4; and Fig. 9 is a side elevational view of the structure as shown in Fig. 8 of the drawings.

Similar characters of reference refer to similar parts and portions throughout the several views of the drawings.

Pilot parachute 1; container 2; main parachute 3; angle release cable 4; main parachute ejection cable 5; airplane parts and portions of my parachute deploying means.

As shown in Fig. 1 of the drawings the pilot parachute 1 is provided with shroud lines 1a having an angle release cable 4 in connection therewith, and a main parachute ejection cable 5, the opposite end of which is connected to the bottom of the container 2. This container 2 is a hollow cylindrical container having an enclosed bottom end 2a and this container 2 is adapted to the position in a substantially vertically disposed recess A in the airplane B, which recess A is open at the upper side of the airplane B, and is disposed at right angles to the axis of the fuselage of the airplane B, so that ejection thereof, by the pilot parachute 1 causes said container 2 to be catapulated a certain distance laterally and above the axis of the fuselage B so that said container 2 clears the tail group of said airplane after being ejected. Packed within the container 2 is the main parachute 3. This main parachute 3 is provided with shroud lines 3a which are connected to airplane suspension cables 6 and 7 secured to the structure of the airplane BB a certain distance above and forward of the center of gravity of the airplane. It will be here noted that the forward end of the angle release cable 4 is provided with a fitting 42 adapted to engage the release hook 8 fixed in connection with the airplane for releasing the pilot parachute 1 from the structure of the airplane when the longitudinal axis of the airplane has been forced to an inclined angle substantially as shown in Fig. 2 of the drawing. The release hook 8, fitting 4a, and angle release cable 4, are structurally similar in detail to the mechanism disclosed in my former application for Letters Patent, Serial No. 637,516, filed December 28, 1945. It will be here noted that the middle portion 3b of the main parachute 3 is connected to the enclosed bottom end 2a of the container 2, so that the main parachute 3 will be fully deployed intermediate its connection with the container 2 and shroud lines 3a secured to the airplane suspension cables 6 and 7 when the pilot parachute is released from the release hook 8, all as shown best in Figs. 2 and 3 of the drawings.

The operation of my parachute deploying means is substantially as follows: As shown in Fig. 1 of the drawing the pilot parachute is in open position, and this pilot parachute 1 is packed in the conventional manner and released by a conventional ripcord not shown, and which is no part of my present invention. The ripcord for releasing the pilot parachute 1 may be of any conventional type extending to the operator's compartment of the airplane B. When the airplane B is in disabled condition and it is desired to safely lower the same to the ground, the pilot parachute 1 is released as hereinbefore described by the manually controlled ripcord accessible to the pilot of the airplane. When the ripcord is pulled the pilot parachute 1 is opened at the upper side of the fuselage of the airplane B, and tension created in the angle release cable 4 applies drag to the airplane fuselage over the center of gravity thereof, tending to force the same into a stall attitude as shown in Fig. 2 of the drawings, which angular relation to the axis of the angle release cable 4 causes said cable to be released at its fitting 4a from the release hook 8, rigidly secured to the fuselage. When the angle release cable 4 is released as shown in Fig. 2 of the drawings the main parachute ejection cable 5 is pulled by the pilot parachute ejecting the container 2 at right angles to the axis of the fuselage B as shown in Fig. 2 of the drawings. It will be noted that such ejection of the container 2 by the pilot parachute 1 is quite rapid causing the container 2 to be ejected a considerable distance out of the path of the tail group of the airplane when in the angular attitude as shown in the drawings. Continued drag on the pilot parachute 1 pulls the container 2 off the main parachute 3, and the attaching cord 3b in connection with the middle of the main parachute 3, connected to the container 2 at the bottom portion 2a, straightens the main parachute 3 for full deployment of the same, and in the event the drag of the pilot parachute in connection with the main parachute is over a certain amount the attaching cord 3b breaks which permits full deployment of the main parachute 3 which is of sufficient area to properly lower the airplane B at a safe speed, and maintain the same fully under control. Cable 5 may also be bridle cables to operate a cluster of main parachutes as in my patent on a Cluster Parachute, U. S. Patent #2,421,167. When the main parachute 3 is fully opened the airplane is suspended in connection with the airplane cables 6 and 7 secured to the shroud lines 3a of said main parachute 3.

In the modification as shown in Figs. 4 to 9 inclusive of the drawings, the parts are designated as follows: the pilot parachute 9, seat and container 10; main parachute 11; release hooks 12; ripcord 13; bridle 14.

The pilot parachute 9 is provided with shroud lines 9a connected to a single cable 9b. This cable 9b is provided with a bridle 14 having opposed cable portions 14a and 14b extending at opposite sides of the container and seat 10. The bridle 14 is a substantially loop-shaped cable structure, having its middle portion extending through the ring 11a connected to the middle of the main parachute 11, which is stowed in the container portion 10a at the back of the seat and container 10. Interconnecting opposite looped portions 14a and 14b of the bridle 14 at opposite sides of the seat and container 10 is the cable 14c which passes around the rear side of the seat and container 10 for preventing the bridle 14 from passing forwardly over the pilot in the seat and container 10 when the pilot parachute is deployed and ejects said seat and container 10. The release hooks 12 are secured at opposite sides of the seat and container 10 near the bottom thereof as shown best in Fig. 4 of the drawings and these release hooks 12 are shown in detail of Figs. 8 and 9 of the drawings wherein the rearwardly projecting hook portions 12a support the loop portions 14a and 14b of the bridle 14 which make reverse bends around said hook portions 12a and extend upwardly into connection with the cable 9b secured to the shroud lines 9a of the pilot parachute 9. Connected to the bridle 14 at upper opposite sides of the seat and container 10 near the ring 11a, are the ripcord fittings, 13a as shown best in Figs. 4 and 6 of the drawings. These ripcords fittings 13a are each provided with a ferrule portion around the bridle 14 and extending lug 13b projecting through the sidewall 10b of the seat and container 10. The ripcord 13 is provided with a handle 13c having diverging cable portions 13d in connection therewith extending through the fair lead 13e in the back of the seat portion of the seat and container 10. On the ripcord 13 at its diverging portions 13d near the ends thereof are pins 13f projecting through the lug portions 13b of the fittings 13a at the inner side of wall 10b of the seat and container 10 at each opposite side thereof. As shown best in Fig. 4 of the drawings the seat and container 10 is provided with a seat portion 10c at its front side in which the pilot of an airplane may sit during operation of the airplane and during descent controlled by the pilot parachute 9 and main parachute 11 when opened. It will be here noted that the seat and container 10 is placed in a recess C communicating with the upper side of an aircraft fuselage and is vertically slidable in said recess C permitting the pilot parachute 9 to remove said seat and container 10 when the ripcord 13 is pulled.

The operation of the modified structure as shown in Figs. 4 to 9 inclusive of the drawing is substantially as follows: The pilot of the airplane finds it necessary to abandon it, the first pulls a conventional ripcord for releasing pilot parachute 9, which is packed at the normally upper portion of the seat and container 10, thus the pilot parachute is deployed in a conventional manner at the upper surface of the aircraft fuselage and when this pilot parachute 9 opens as shown in Figs. 4 and 5 of the drawings, the drag created thereby in connection with the cable 9b forcibly catapults the seat and container 10, together with the pilot at right angles to the axis of the airplane, sufficiently clearing the pilot of the upper surface of the airplane, whereby the tail group thereof may pass the pilot thus insuring safety of the pilot in escaping from the airplane. After the seat and container 10 is ejected from the airplane, the bridle 14 exerts the drag substantially parallel to the axis of the hook portions 12a of the release hooks 12 which causes the reverse loop portions of the bridle 14 to be forcefully removed from said hook portions 12a whereby the bridle 14 is then secured by the ripcord fittings 13a in connection therewith as shown in Figs. 4 and 6 of the drawings. It will be noted that the bridle 14 acted upon by the pilot parachute 9 exerts force at the bottom of the seat and container 10 when ejecting the same in a similar manner to the ejection of the container 2 by the pilot parachute 1 as hereinbefore described in the structure disclosed in Figs. 1 and 3 inclusive of the drawings. It will be here noted that the hooks 12 are thus primarily useful in the initial ejection of the seat and container 10 from the airplane and then serve to release the bridle 14 to the ripcord fittings 13a controlling release of the main parachute 11. After the bridle 14 has been released from the hooks 12a and suspends the seat and container 10 by the ripcord fittings 13a, the cargo including the pilot in connection with the seat and container 10 is slowed down sufficiently so that the main parachute may be safely opened without creating undue shock load in connection with the seat and container 10 and the pilot. The main parachute is manually deployed by the pilot who engages the ripcord handle 13c and pulls the ripcord 13 through the fair lead 13e releasing the pins 13f from the ripcord fittings 13a which permit the bridle 14 to exert force on the ring 11a attached to the middle of the main parachute, which deploys the main parachute, and when the main parachute is opened, the shroud lines 11b thereof, in connection with the fitting 11c secured to the bottom of the seat and container 10 supports said seat and container together with the pilot therein. In this supported relationship the pilot is slowly lowered to the ground. As hereinbefore set forth the pilot parachute opens preliminary to the opening of the main parachute, and this pilot parachute, designated 9, performs 3 distinct functions. One function is ejection of the cargo, deceleration thereof so that shock load of the main parachute in opening is decreased and deployment of the main parachute. These functions are particularly adapted for use in connection with the pilot or cargoes being removed from disabled aircraft traveling at high speed.

In certain types of aircraft, and for other personnel in aircraft such as a gunner or bombardier in the belly of aircraft, it is entirely practical to use this pilot ejection method, with necessary modifications which do not in fact depart from the spirit of this invention. Thus it is reasonable to expect that all the occupants of military aircraft may be protected by the application of this invention.

Also for protection of the pilot when flying at low speed as in the takeoff from an airport, where at such low speed this pilot parachute would have to have an assisting means such as a spring or powder charge to help eject the pilot from such aircraft, I do not wish to be limited to a pilot parachute ejecting method as herein described and without said auxiliary ejecting means.

Though I have shown and described a particular construction, combination and arrangement of parts and portions and a certain modification, I do not wish to be limited to this particular construction, combination and arrangement, nor to the modification, but do desire to include in the scope of my invention the construction, combination and arrangement substantially as set forth in the appended claims.

Having thus described my invention, what I claim as new and desire to secure by Letters Patent is:

1. In a parachute deploying means in the class described, the combination of an airplane having a recess portion in and communicating with the upper outer side of the fuselage thereof, a removable container in said recess portion and having an open end and directed outwardly thereof, a pilot parachute having shroud lines connected to the innermost portion of said removable container and a main parachute in said removable container adapted to be opened by said pilot parachute after said removable container is ejected from said recess in said aircraft by said pilot parachute.

2. In a parachute deploying means in the class described, the combination of an airplane having a recess in the upper outer side of the fuselage thereof open at said upper side, a removable container in said recess and having an open end directed outwardly thereof, a main parachute in said removable container, and a pilot parachute having shroud lines connected to the innermost portions of said removable container, whereby said pilot parachute is first adapted to eject said removable container from said aircraft, and then open said main parachute from said removable container.

3. In a parachute deploying means in the class described, the combination of an aircraft having a recess portion in the normally upper outer side of the fuselage thereof and open at said upper side, a movable container positioned in said recess having an open end directed outwardly thereof, a main parachute in said container, having its middle portion connected to the bottom thereof, and provided with shroud lines near the upper, open end of said container, suspension cables in connection with said shroud lines connected to the upper portion of the fuselage of said aircraft, an ejection cable connected to the outer side of said container at the bottom portion thereof and a pilot parachute in connection with said ejection cable arranged to pull said container out of said recess and remove said container from said main parachute.

4. In a parachute deploying means in the class described, the combination of an aircraft having a recess portion in the normally outer upper side of the fuselage thereof and open at said upper side, a movable container in said recess, a main parachute in said container, having its middle portion connected to the bottom thereof, and provided with shroud lines near the upper, open end of said container, suspension cables in connection with said shroud lines connected to the upper portion of the fuselage of said aircraft, an ejection cable connected to the outer side of said container at the bottom portion thereof and a pilot parachute in connection with said ejection cable arranged to pull said container out of said recess and remove said container from said parachute, said pilot parachute having a secondary release cable in connection therewith removably connected with the forward portion at the upper side of the fuselage of said airplane, whereby said pilot parachute is released from said airplane after forcing said airplane into an inclined attitude.

5. In a parachute deploying means in the class described, a combination of an airplane having a recess in the upper outer portion thereof, a removable container in said recess having a normally upper, open end upwardly directed and an enclosed inwardly directed bottom end movable angularly to the axis of said aircraft, a main parachute in said removable container having its middle portion secured to the innermost bottom portion of said removable container and having shroud lines near the open end of said container in connection with the fuselage of said airplane and a pilot parachute in connection with the bottom portion of said removable container adapted to eject the same from said airplane.

6. In a parachute deploying means in the class described, a combination of an airplane having a recess in the upper outer portion thereof, a container in said recess having a normally upper, open end and an enclosed bottom end movable perpendicular to the axis of said aircraft, a main parachute in said container having its middle portion secured to the innermost bottom portion of said container and having shroud lines near the open end of said container, in connection with the fuselage of said airplane and a pilot parachute in connection with the bottom portion of said container adapted to eject the same from said airplane, an angle release cable in connection with said pilot parachute having a release member at its extending end removably connected to the forward portion of said aircraft fuselage above the center of gravity thereof, whereby opening of said pilot parachute forces said airplane into an inclined attitude automatically releasing said angle release cable and creating tension in connection with said container for ejecting the same from said aircraft fuselage and thereafter removing said container from said main parachute.

7. In a parachute deploying means in the class described, the combination of an aircraft having a recess in the normally upper outer portion thereof, a seat and container in said recess having a container portion therein, a main parachute in said container portion, a pilot parachute having its shroud lines connected to the bottom of said seat and container, rearwardly disposed hooks to which said pilot parachute is removably connected, said shroud lines of said pilot parachute also connected with said main parachute in said seat and container whereby said seat and container is ejected from said airplane by said pilot parachute pulling on the bottom of said seat and container until cleared from said aircraft whereupon said hooks release said pilot parachute from said seat and container permitting the same to deploy said main parachute from said container portion of said seat and container.

8. In a parachute deploying means in the class described, the combination of an aircraft having a recess in the normally upper outer portion thereof, a seat and container in said recess having a container portion therein, a main parachute in said container portion, a pilot parachute having its shroud lines connected to the bottom of said seat and container, rearwardly disposed hooks to which said pilot parachute is removably connected, said shroud lines of said pilot parachute also connected with said main parachute in said seat and container whereby said seat and container is ejected from said airplane by said pilot parachute pulling on the bottom of said seat and container until cleared from said aircraft whereupon said hooks release said pilot parachute from said seat and container permitting the same to deploy said main parachute from said container portion of said seats and container, manually controlled ripcord means arranged to control the deployment of said main parachute when acted upon by said pilot parachute.

9. In a parachute deploying means of the class described, a combination of a seat and container member adapted to be positioned in a recess at the upper outer portion of an aircraft fuselage, a pilot parachute, a cable in connection with the shroud lines thereof, rearwardly disposed hook means secured at the lower portion of said seat and container member over which said cable is looped, a main parachute in said seat and container member removable from the upper portion thereof and having shroud lines connected to the lower portion of said seat and extending upwardly through said upper open portion when said main parachute is deployed, said cable in connection with said pilot parachute looped over said hook means extending upwardly into connection with the middle portion of said main parachute and ripcord means engaging said cable whereby deployment of said pilot parachute forces said seat and container out of said airplane and releases said cable rearwardly from said hook means exerting forth all of said ripcord means whereby manual operation thereof releases said cable and permits the same to deploy said main parachute from said container.

10. In a parachute deploying means in the class described, a combination of a seat and container member adapted to be positioned in a recess at the upper outer portion of an aircraft fuselage, a pilot parachute, a cable in connection with the shroud lines thereof, rearwardly disposed hook means secured at the lower portion of said seat and container member over which said cable is looped, a main parachute in said seat and container member removable from the upper open portion thereof and having shroud lines connected to the lower portion of said seat and extending upwardly through said upper open portion when said main parachute is deployed, said cable in connection with said pilot parachute looped over said hook means extending upwardly into connection with the middle portion of said main parachute and ripcord means engaging said cable whereby deployment of said pilot parachute forces said seat and container out of said airplane and releases said cable rearwardly from said hook means exerting forth all of said ripcord means whereby manual operation thereof releases said cable and permits the same to deploy said main parachute from said container, said cable in connection with said pilot parachute extending in the form of a bridle over the upper portion of said seat and container member and downwardly over opposite sides thereof into connection with said hook means whereby the middle portion of said bridle shaped cable is connected to the middle portion of said main parachute for stabilizing the forces transferred to opposite sides of seat and container member.

PREVOST F. SMITH.

REFERENCES CITED

The following references are of record in the file of this patent:

UNITED STATES PATENTS

| Number | Name | Date |
|---|---|---|
| 1,165,891 | Martin | Dec. 28, 1915 |
| 1,720,041 | Hall | July 9, 1929 |
| 1,823,758 | Owens | Sept. 15, 1931 |
| 2,392,448 | Atherton | Jan. 8, 1946 |
| 2,439,318 | Quilter | Apr. 6, 1948 |